United States Patent [19]

Fujimura

[11] 4,393,428
[45] Jul. 12, 1983

[54] MAGNETIC HEAD

[75] Inventor: Masayuki Fujimura, Chichibu, Japan

[73] Assignees: Canon Kabushiki Kaisha, Tokyo; Canon Denshi Kabushiki Kaisha, Saitama, both of Japan

[21] Appl. No.: 229,934

[22] Filed: Jan. 30, 1981

[30] Foreign Application Priority Data

Feb. 12, 1980 [JP] Japan .................................. 55-16454

[51] Int. Cl.$^3$ ............................................. G11B 5/20
[52] U.S. Cl. ................................... 360/123; 360/125
[58] Field of Search ........ 360/123, 122, 110, 124–125, 360/129

[56] References Cited

U.S. PATENT DOCUMENTS 4,037,264 7/1977 Barkley et al. ........................ 360/129
4,245,268 1/1981 Toshimitsu ....................... 360/123 X

FOREIGN PATENT DOCUMENTS

54-110814 8/1979 Japan ................................... 360/129

Primary Examiner—John H. Wolff
Attorney, Agent, or Firm—Fitzpatrick, Cella, Harper & Scinto

[57] ABSTRACT

In a magnetic head, a core half having a coil wound thereon and a core half having no coil wound thereon are disposed in abutting relationship with each other to form a magnetic gap. A projected portion is provided on a part of one core half in order to reduce the amount of induced noise produced in the coil by a noise magnetic flux entering from the front of the magnetic gap. The core half having a coil wound thereon and belonging to one magnetic head element and the core half having no coil wound thereon and belonging to another magnetic head element are opposed to each other to provide a compact multi-element magnetic head having reduced induced noise. Further, the magnetic head elements in the multi-element magnetic head present a minimum amount of induced noise for the noise magnetic flux entering from the front of the magnetic gap.

5 Claims, 19 Drawing Figures

MAGNETIC HEAD

BACKGROUND OF THE INVENTION

1. Field of the Invention

This invention relates to a magnetic head in which the amount of induced noise is reduced for the noise magnetic flux entering from the front of the magnetic gap.

2. Description of the Prior Art

Generally, a magnetic head encounters a situation that during recording or reproduction, induced noise is produced by a noise magnetic flux generated from a tape driving motor, terrestrial magnetism or other external instrument and such induced noise mixes with the regular output information from a magnetic recording medium such as a magnetic tape or the like to thereby prevent accurate information from being obtained. In the magnetic head, therefore, the core thereof forming a magnetic circuit is usually surrounded by a shield case so as to be magnetically isolated from the outside and protected against the noise magnetic flux. However, from the viewpoint of the structure of the magnetic head, the magnetic gap portion of the core must be brought into direct or indirect contact with a magnetic recording medium such as a magnetic tape or the like and therefore, the surface of the core which is in contact with the magnetic recording medium is exposed from the shield case. Thus, such surface of the core is the greatest weak point in magnetically shielding the magnetic head. FIGS. 1A–4A of the accompanying drawings show typical constructions of conventional magnetic heads in which a coil 2 is wound on a core 1 forming a magnetic circuit and the core is surrounded by a shield case 3, and FIGS. 1B–4B which correspond to FIGS. 1A–4A show the amount of induced noise flowing through the coil 2. In FIGS. 1A–4A, the core is protected by the shield case 3 against the magnetic flux entering from the X-axis direction, while against the magnetic flux entering from the Y-axis direction (from the front of the magnetic gap), the core is unavoidably subjected to the influence from the open portion 3a of the shield case 3 because the portion S of the core 1 which is contacted by the magnetic recording medium is exposed. Accordingly, a magnetic head of a construction that has a minimum amount of induced noise in the Y-axis direction is more advantageous in that it is less susceptible to the influence of the noise magnetic flux.

Figure 1A:
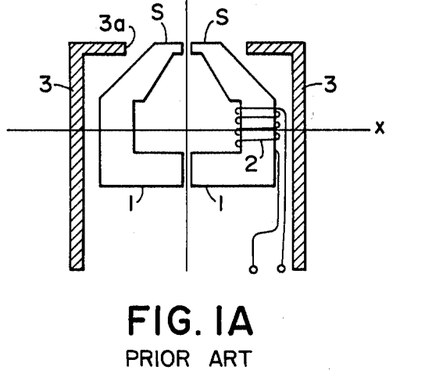
FIG. 1A is a plan view showing the interior of a half wind system magnetic head.
Figure 1B:
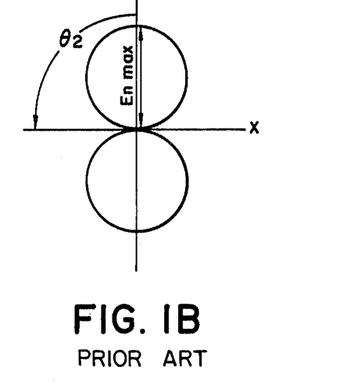
FIG. 1B is a graph showing the induced noise characteristic of the half wind system magnetic head.

FIG. 1A shows a half wind system which is structurally simple (a coil 2 is wound only on one side of a core 1), but as regards the induced noise, this system is disadvantageous because the maximum value of induced noise lies in the Y-axis direction as shown in FIG. 1B.

Figure 2A:
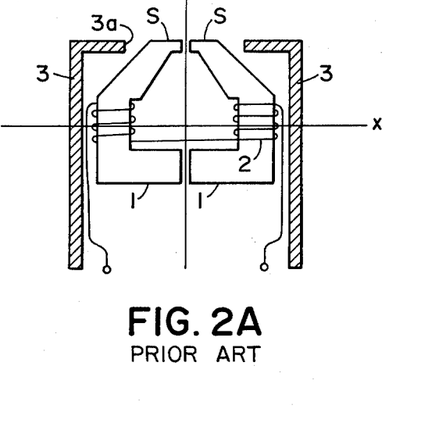
FIG. 2A is a plan view showing the interior of a balance wind system magnetic head.
Figure 2B:
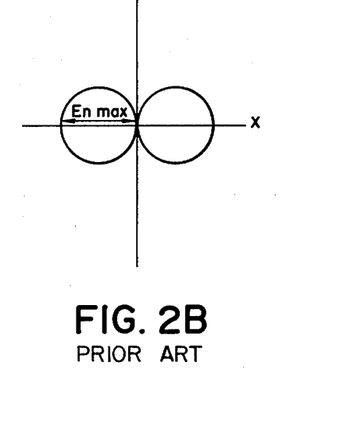
FIG. 2B is a graph showing the induced noise characteristic of the balance wind system magnetic head.

FIG. 2A shows a balance wind system (coils 2 are wound on both sides of a core 1 in opposite directions) and this is an advantageous structure in which the induced noise assumes a minimum value in the Y-axis direction as shown in FIG. 2B. However, this system requires two coils and an intermediate connecting lead wire for connecting the two coils, and this results in disadvantages such as increased cost of parts, complexity of assembly and an increased number of assembling steps.

Figure 3A:
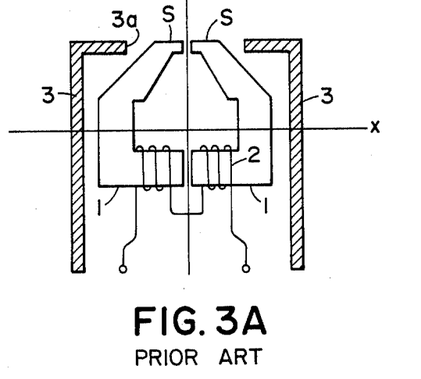
FIG. 3A is a plan view showing the interior of a back balance wind system magnetic head.
Figure 3B:
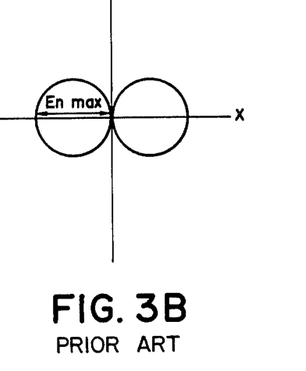
FIG. 3B is a graph showing the induced noise characteristic of the back balance wind system magnetic head.

FIG. 3A shows a back balance wind system (coils 2 are wound on the both lower portions of a core 1) and this system is excellent in that as in the balance wind system of FIG. 2A, the induced noise in the Y-axis direction assumes a minimum value as shown in FIG. 3B, but it suffers from disadvantages such as complexity of assembly, an increased number of assembling steps and increased cost of parts.

Figure 4A:
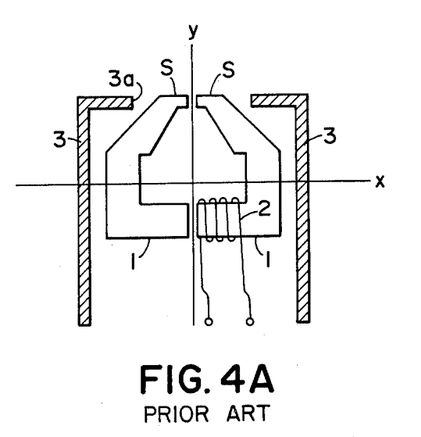
FIG. 4A is a plan view showing the interior of a back half wind system magnetic head.
Figure 4B:
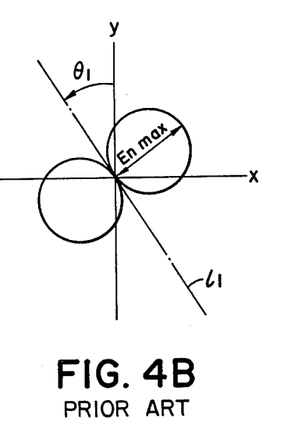
FIG. 4B is a graph showing the induced noise characteristic of the back half wind system magnetic head.

FIG. 4A shows a back half wind system (a coil 2 is wound only on one lower portion of a core 1) which, as compared with the balance wind system of FIG. 2A and the back balance wind system of FIG. 3A, is structurally very simple and the coil need not be directly wound on the core, but a separately prepared coil 2 may be inserted over one half of the core 1 and this leads to reduced cost of manufacture. However, as shown in FIG. 4B, the maximum value of induced noise approaches the Y-axis direction and therefore, as compared with the systems of FIGS. 2B and 3B, the amount of induced noise is great (the induced noise characteristic is bad).

Thus, in order to reduce the amount of induced noise, it has heretofore been unavoidable to adopt the balance wind system or the back balance wind system in spite of increased cost of manufacture.

SUMMARY OF THE INVENTION

It is a first object of the present invention to provide a coil on one of a plurality of core halves to thereby reduce the amount of induced noise produced in the coil by a noise magnetic flux entering from the front of the magnetic gap.

It is a second object of the present invention to make a multi-element magnetic head compact.

It is a third object of the present invention to cause each magnetic head element in a multi-element magnetic head to present a minimum amount of induced noise for a noise magnetic flux entering from the front of the magnetic gap.

The invention will become fully apparent from the following detailed description thereof taken in conjunction with the accompanying drawings.

DESCRIPTION OF THE PREFERRED EMBODIMENTS

The magnetic head of the present invention utilizes the back half wind system which is structurally simplest, easiest to manufacture and assemble and lowest in cost of the aforementioned four types of magnetic heads (the half wind system, the balance wind system, the back balance wind system and the back half wind system), and moreover has been improved so that the amount of induced noise therein is equal to that in the back balance wind system.

The invention will hereinafter be described in detail.

Figure 5:
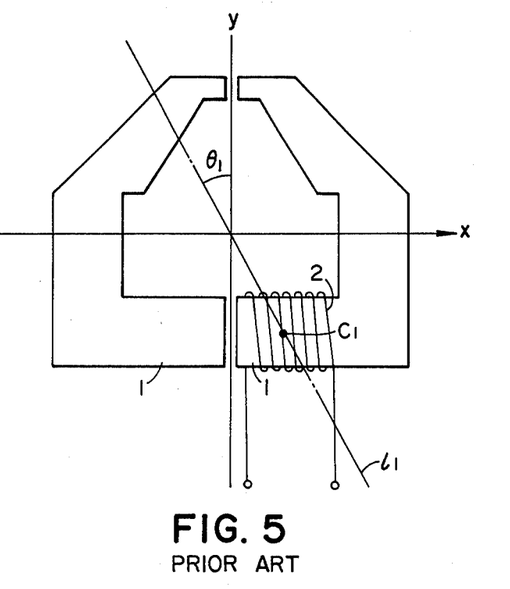
FIG. 5 is a plan view showing a back half wind system magnetic head.
Figure 6:
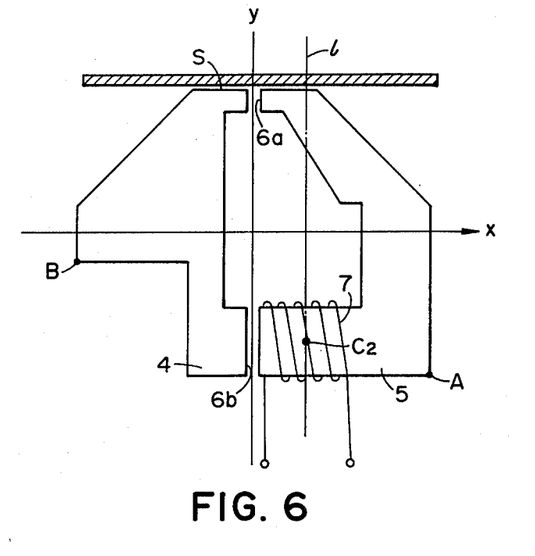
FIG. 6 is a plan view showing the magnetic head according to a first embodiment of the present invention.

To make the invention well understood, a magnetic balance line will first be described by reference to FIGS. 5 and 6. FIG. 5 shows a plan view of a conventional back half wind system magnetic head having a construction equivalent to that of FIG. 4A. (For simplicity of illustration, the shield case is not shown.) In the magnetic head of FIG. 5, a core 1 is bilaterally symmetrical and a coil 2 is asymmetrically provided on the right lower portion of the core. Therefore, the magnetic balance line represented by a segment $l_1$ passes through the center point $C_1$ of the coil 2 and is inclined leftwardly by an angle $\theta_1$ with respect to Y-axis. Generally, the magnetic balance line of a core refers to a segment in which the influence of the noise magnetic flux of the head is smallest as shown in FIG. 4B. Accordingly, the induced noise characteristic shown in FIG. 4B is shifted by the angle $\theta_1$ with respect to the Y-axis direction. Also, if the coil 2 shown in FIG. 3A is brought to the right, the coil arrangement will become such as shown in FIG. 4A, and if the coil 2 shown in FIG. 4A is raised rightwardly upwardly along the core 1, the coil arrangement will become such as shown in FIG. 1A, and it can be understood that with such displacement of the coil 2, the magnetic balance line $l_1$ coincident with Y-axis as shown in FIG. 3B becomes inclined leftwardly by an angle $\theta_1$ with respect to Y-axis in FIG. 4B and further becomes inclined leftwardly by an angle $\theta_2$ (90°) with respect to Y-axis so as to be coincident with X-axis in FIG. 1B. However, these are explained with respect to a case where the core 1 is bilaterally symmetrical. In the present invention, as shown in FIG. 6, the shape of a core half 4 having no coil wound thereon and the shape of a core half 5 having a coil 7 wound thereon are made to differ from each other so as to be bilaterally asymmetrical, and the portion of the core half 4 near the magnetic gap is formed by a sidewardly projecting portion 7. In this manner, there is formed a magnetic balance line 1 (passing through the center point $C_2$ of the coil 7) parallel to Y-axis (a direction substantially perpendicular) to X-axis along which a magnetic tape T is moved).

Figure 7A:
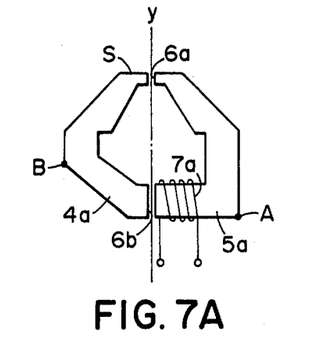
FIG. 7A is a plan view showing the magnetic head according to a second embodiment of the present invention.
Figure 7B:
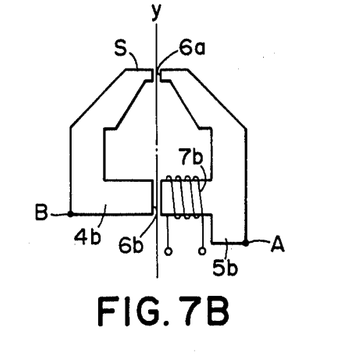
FIG. 7B is a plan view showing the magnetic head according to a third embodiment of the present invention.
Figure 7C:
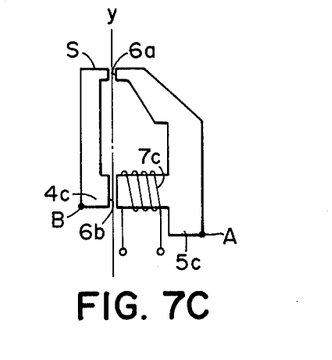
FIG. 7C is a plan view showing the magnetic head according to a fourth embodiment of the present invention.

FIG. 6 is a plan view showing a first embodiment of the magnetic head according to the present invention. In this embodiment, a core half 4 and a core half 5 both formed of a high permeability substance such as Permalloy or Sendust are disposed in abutting relationship with each other so that a magnetic gap 6a for recording or reproducing information is formed near the surface of the core along which a magnetic tape T slides and so that an abutting portion 6b is formed at a location remote from the magnetic gap 6a. A coil 7 is wound on the portion of the core half 5 which is adjacent to the abutting portion 6b. FIGS. 7A–C are plan views showing second to fourth embodiments of the magnetic head according to the present invention. In these embodiments, bilaterally asymmetrical core halves 4a and 5a, 4b and 5b, or 4c and 5c are disposed in abutting relationship with each other, and a coil 7a, 7b, 7c is wound on each core half 5a, 5b, 5c, respectively. In the constructions of FIGS. 7B and 7C, the portion of the core half 5b, 5c which is remote from the magnetic gap 6a is made into a projected shape so as to form a magnetic balance line parallel to Y-axis.

Figure 8A:
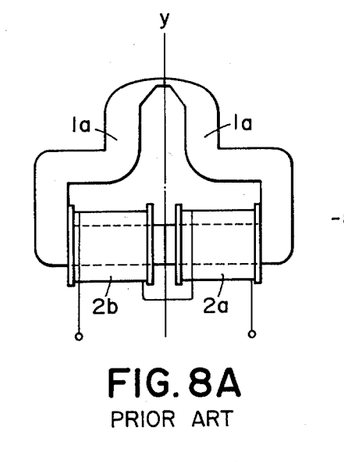
FIG. 8A is a plan view showing a back balance wind system magnetic head for providing a multi-element arrangement.
Figure 8B:
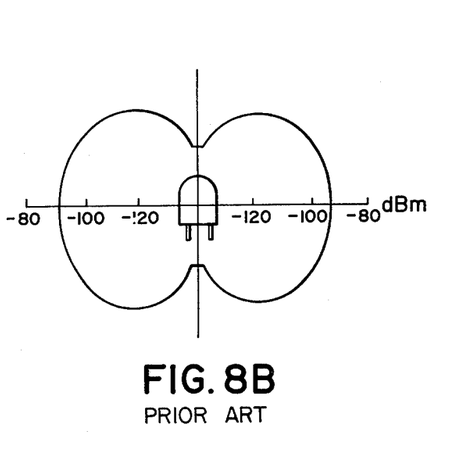
FIG. 8B is a graph showing the induced noise characteristic of the back balance wind system magnetic head for providing a multi-element arrangement.
Figure 9A:
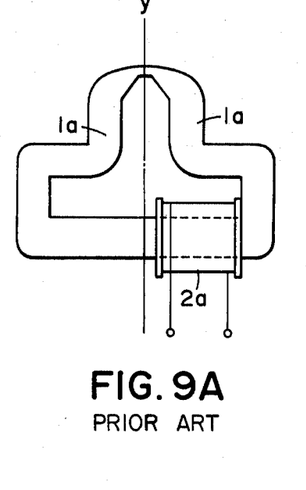
FIG. 9A is a plan view showing a back half wind system magnetic head for providing a multi-element arrangement.
Figure 9B:
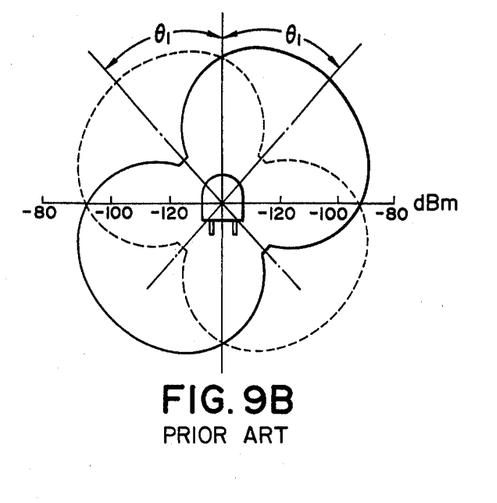
FIG. 9B is a graph showing the induced noise characteristic of the back half wind system magnetic head for providing a multi-element arrangement.
Figure 10A:
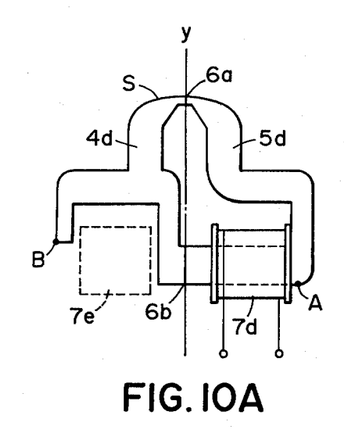
FIG. 10A is a plan view showing the magnetic head for providing a multi-element arrangement according to a fifth embodiment of the present invention.
Figure 10B:
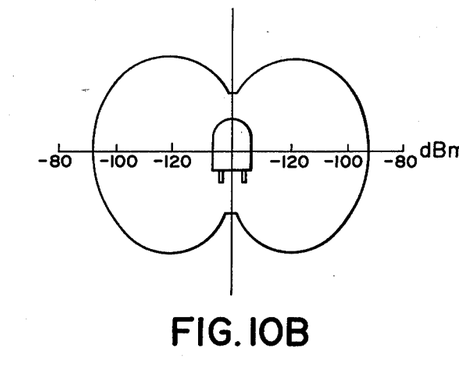
FIG. 10B is a graph showing the induced noise characteristic of the magnetic head according to the fifth embodiment of the present invention.

FIGS. 8A and 8B and FIGS. 9A and 9B show conventional magnetic heads for providing multi-element arrangements and the induced noise characteristics thereof, and FIGS. 10A and 10B show the magnetic head of the present invention for providing a multi-element arrangement and the induced noise characteristic thereof.

The conventional magnetic head shown in FIG. 8A comprises a core 1a and coils 2a, 2b wound thereof, and it is a form of the back balance wind system described in connection with FIG. 3A. Accordingly, the induced noise characteristic shown in FIG. 8B, like the characteristic shown in FIG. 3B, is such that the magnetic balance line is in the same direction as Y-axis. The disadvantages of the back balance wind system have been described previously and further, in a case where it is made into a multi-element arrangement, coils between adjacent channels contact each other, thus making it difficult to make the magnetic head compact. Therefore, if the left coil 2b is removed from the construction of FIG. 8A, there will be obtained the construction shown in FIG. 9A. Then, if a plurality of magnetic head elements in which coils are put in left and right positions (provided on the opposite sides) are layered one upon another by juxtaposing the magnetic head elements closely adjacent to one another, the core and coil will contact each other. Therefore, the magnetic head can be made compact by the amount of projection of the coil in a half channel.

The conventional magnetic head shown in FIG. 9A is a form of the back half wind system described in connection with FIG. 4A. Accordingly, the induced noise characteristic (solid line) shown in FIG. 9B, like the characteristic shown in FIG. 5B, is such that the magnetic balance line is inclined leftwardly by an angle $\theta_1$ with respect to Y-axis and thus, the unshown head layered for providing said multi-element arrangement is inclined rightwardly by an angle $\theta_1$ with respect to Y-axis, as indicated by a broken line.

FIG. 10A is a plan view showing a fifth embodiment of the magnetic head according to the present invention. In this embodiment, bilaterally asymmetrical core halves 4d and 5d are disposed in abutting relationship with each other and a coil 7d is wound on the core half 5d. The core half 4d has a portion of the magnetic circuit passing through the core half 5d and the coil 7d, and a portion projected outwardly from the magnetic circuit.

FIG. 10B shows the induced noise characteristic of the magnetic head shown in FIG. 10A, and like the characteristic shown in FIG. 8B, it is such that the magnetic balance line is parallel to Y-axis. Moreover, even if the head elements are layered as previously described to provide a multi-element arrangement, the core half 4d and the coil 7e (broken line) of an adjacent head element do not come into contact with each other. Therefore, the head elements can be layered at a higher density than in the construction of FIG. 9A and thus, the magnetic head can be made compact. The construction of FIG. 10A has the merit of the back half wind system described in connection with FIG. 4A, and eliminates the disadvantage thereof (the badness of the induced noise characteristic). As described above, in the embodiments of the magnetic head according to the present invention shown in FIGS. 6, 7A, B and C, and FIG. 10A, the two core halves are asymmetrical. In the core half on which the coil is wound, the portion thereof most remote from the surface along which the magnetic tape slides or the magnetic gap with respect to the Y-axis direction is defined as portion A. In the core half on which no coil is wound, the portion thereof which is most remote from said core half on which the coil is wound with respect to the X-axis direction and which is as remote as possible from the surface along which the magnetic tape slides or the magnetic gap with respect to the Y-axis direction is defined as portion B. If in this construction portion B is made most remote relative to the X-axis from the core half on which the coil is wound as a first priority, and portion B is made as remote as possible relative to the Y-axis from the magnetic gap as a second priority, then the portion B is nearer to the surface along which the magnetic tape slides or the magnetic gap with respect to the Y-axis direction than is the portion A, and the amount of induced noise produced in the coil relative to a noise magnetic flux entering from the Y-axis direction, namely, from the front of the magnetic gap can be minimized. Thus, in the magnetic head of the present invention, the core halves disposed in abutting relationship as previously described are asymmetrical and, even if it is the back half wind system, the magnetic balance line is parallel to Y-axis. This reduces the cost of manufacture and reduces the induced noise and further, where a multi-element arrangement is adopted, a compact magnetic head can be realized.

What I claim is:

1. A magnetic head comprising:
   first and second core segments together defining a confronting surface along which a recording medium may travel in confronting relation;
   said first core segment being made of a high permeability substance and being formed with a first portion defining a section of said confronting surface and a first end surface facing toward an axis which is perpendicular to said confronting surface, said first core segment further being formed with a second portion disposed remote from said confronting surface and having a second end surface also facing toward said axis, said first core segment forming a part of a magnetic circuit;
   a coil wound about said first core segment in the region of said second portion; and
   said second core segment being made of a high permeability substance and being disposed substantially in abutting relation with said first core segment to form a magnetic gap having one boundary defined by said first end surface and to form a remote gap having one boundary defined by said second end surface, said second core segment being asymetrical relative to said first core segment about a line which passes through said magnetic gap and said remote gap and forming another part of said magnetic circuit, said second core segment further being formed with a unitary projecting portion, projecting away from said axis, of shape and size to compensate for said coil wound on said first core segment and thus to provide for a magnetic balance line generated in said magnetic head to be approximately parallel to a line which passes through said magnetic gap and said remote gap.

2. A magnetic head according to claim 1, wherein said projecting portion of said second core segment comprises a point most remote from said confronting surface at a location also most remote from said axis, and said point being nearer to said magnetic gap than the point on said first coil segment most remote from said magnetic gap, in order to reduce the amount of induced noise produced in said coil by a noise magnetic flux entering from the front of said magnetic gap.

3. A magnetic head according to claim 2, wherein said point on said projecting portion of said second core segment lies outside an area corresponding to said coil wound on said first core segment and symmetrically located with respect to said axis opposite said core, said last recited point also being located outside of the magnetic circuit generated in the magnetic head.

4. A magnetic head comprising:
   first and second core segments together defining a confronting surface along which a recording medium may travel in confronting relation;
   said first core segment being made of a high permeability substance and being formed with a first portion defining a section of said confronting surface and a first end surface facing toward an axis which is perpendicular to said confronting surface, said first core segment further being formed with a second portion disposed remote from said confronting surface and having a second end surface facing toward said axis, said first core segment forming a part of a magnetic circuit;
   said second core segment being made of a high permeability substance and being disposed in substantially abutting relation with said first core segment to form a magnetic gap having one boundary defined by said first end surface and to form a remote gap having one boundary defined by said second end surface, said second core segment being asymetrical relative to said first core segment about a line which passes through said magnetic gap and said remote gap and forming another part of said magnetic circuit, said second core segment further being formed with a unitary projecting portion which extends in the direction away from said confronting surface, a coil wound on said second core segment in the region of said remote gap; and said projecting portion of said second core segment being disposed in the region of said remote gap and being of shape and size to compensate for said coil and thus provide for a magnetic balance line generated in said magnetic head to be approximately parallel to a line which passes through said magnetic gap and said remote gap.

5. A magnetic head according to claim 4, wherein said projecting portion comprises a point most remote from said magnetic gap, said point being more remote from said magnetic gap than is the point on said first core segment most remote from said magnetic gap, in order to reduce the amount of induced noise produced in said coil by a noise magnetic flux entering from the front of said magnetic gap.

* * * * *

UNITED STATES PATENT AND TRADEMARK OFFICE
CERTIFICATE OF CORRECTION

PATENT NO. : 4,393,428

DATED : July 12, 1983

INVENTOR(S) : MASAYUKI FUJIMURA

Page 1 of 2

It is certified that error appears in the above-identified patent and that said Letters Patent is hereby corrected as shown below:

Column 3

Line 44, change "$1_1$" to --$\ell_1$--.

Line 58, change "$1_1$" to --$\ell_1$--.

Column 4

Line 4, change "1 " to --$\ell$ --.

Line 19, change "7A-C" to --7A-7C--.

Line 43, between "as" and "Y", insert --the--.

Line 65, between "to" and "Y", insert --the--.

Line 68, after "to" insert --the--.

Column 5

Line 13, between "to" and "Y", insert --the--.

Line 53, between "to" and "Y", insert --the--.

UNITED STATES PATENT AND TRADEMARK OFFICE
CERTIFICATE OF CORRECTION

PATENT NO. : 4,393,428

DATED : July 12, 1983

INVENTOR(S) : MASAYUKI FUJIMURA

It is certified that error appears in the above-identified patent and that said Letters Patent is hereby corrected as shown below:

Column 6, line 48
(Claim 4, line 8)

Change "fajcing" to --facing--.

Signed and Sealed this

Thirty-first Day of July 1984

[SEAL]

Attest:

Attesting Officer

GERALD J. MOSSINGHOFF

Commissioner of Patents and Trademarks